Nov. 25, 1952 B. G. V. INGVE 2,618,807

ARRANGEMENT FOR COOLING OF POROUS FIBER BOARDS

Filed March 29, 1949 2 SHEETS—SHEET 1

Inventor:
Bror Gunnar Vilhelm Ingve
by his Attorneys
Howson & Howson

Nov. 25, 1952 B. G. V. INGVE 2,618,807

ARRANGEMENT FOR COOLING OF POROUS FIBER BOARDS

Filed March 29, 1949 2 SHEETS—SHEET 2

Inventor:
Bror Gunnar Vilhelm Ingve
by his Attorneys
Howson & Howson

Patented Nov. 25, 1952

2,618,807

UNITED STATES PATENT OFFICE 2,618,807

ARRANGEMENT FOR COOLING OF POROUS FIBER BOARDS

Bror Gunnar Vilhelm Ingve, Abrahamsberg, Sweden, assignor to A B Svenska Flaktfabriken, Stockholm, Sweden Application March 29, 1949, Serial No. 84,032
In Sweden April 30, 1948

5 Claims. (Cl. 15—302)

When manufacturing porous fibre boards, particularly wood fibre boards, these will undergo a drying process, during which they are subjected to fairly great heat and take a comparatively high temperature of more than 100° C. and up to 170° C. or more. This high temperature is required in order to make the fibres in the boards keep well together and simultaneously enable them to keep away moisture, i. e. reduce the absorption of the boards in damp air.

If fibre boards after having passed through such a drying process, are piled in groups in a storing room without having previously been cooled down, it has proved that the temperature of the boards rises, so that self-ignition will finally occur. In order to prevent this, it is known to place so-called spacers between the boards, so that the air gets an opportunity to circulate between the boards and remove some of their heat and thus prevent the risk of spontaneous ignition.

This, however, involves a great deal of additional expenses and, as in all cases where brittle material is handled manually, fairly much breakage cannot be avoided, thus making the number of damaged boards during the manufacturing process increase.

The present invention has the object to obviate such drawbacks and provide an arrangement by means of which the boards can be cooled down after the heat treatment without making it necessary to displace the boards manually to any great extent or piling them in groups with spacers between each board or at all storing the boards for cooling in accommodations requiring large space.

The invention thus relates to an arrangement for cooling porous fibre boards by sucking air through the boards and in this way depriving them of part of their heat contents, and the most characteristic feature of the invention is that it comprises a suction box having a plane suction opening, a suction device connected to the suction box and an endless wire screen consisting of a close portion and an open one in series, which portions together form the endless wire screen adapted to be moved across the suction opening, so that this will alternately be covered by a close and/or laid bare by an open part of the wire screen, the close portion having about the same resistance to the flow of air as the fibre board, while the open portion is open to such an extent as practically not to offer any resistance at all to the air. Other features characterizing the arrangement according to the invention will elucidate from the embodiment described in detail hereinafter.

The invention is demonstrated in one of its embodiments by way of example in the accompanying drawing, in which.

Figures 1, 3, 4, 5:
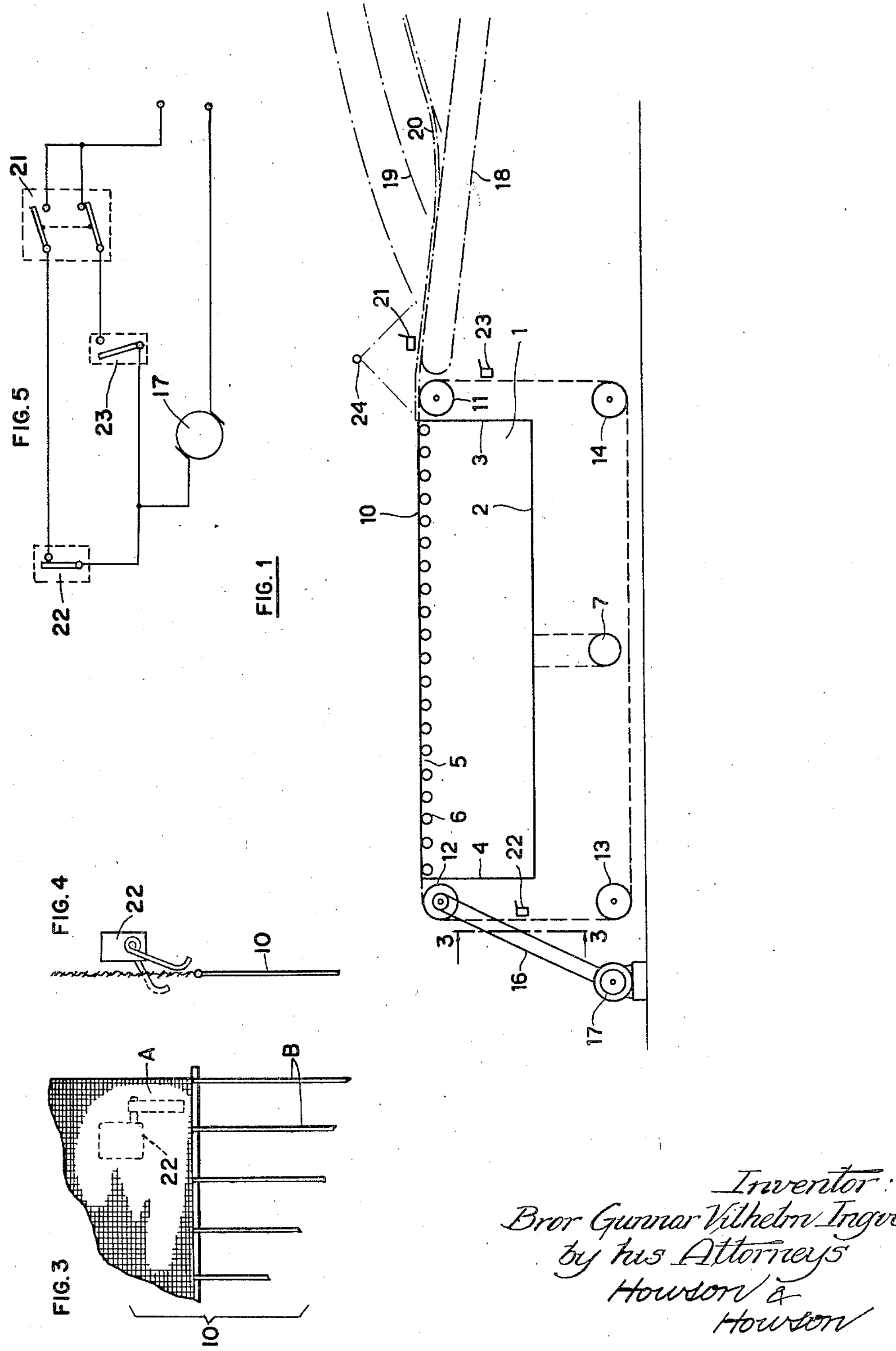
Fig. 1 shows a vertical section of a cooling device according to the invention diagrammatically.
Fig. 3 is an elevational view on line 3—3, Fig. 1.
Fig. 4 is a side elevational view of the disclosure in Fig. 3.
Fig. 5 is a schematic showing of the control circuit and mechanism for the apparatus.
Figure 2:
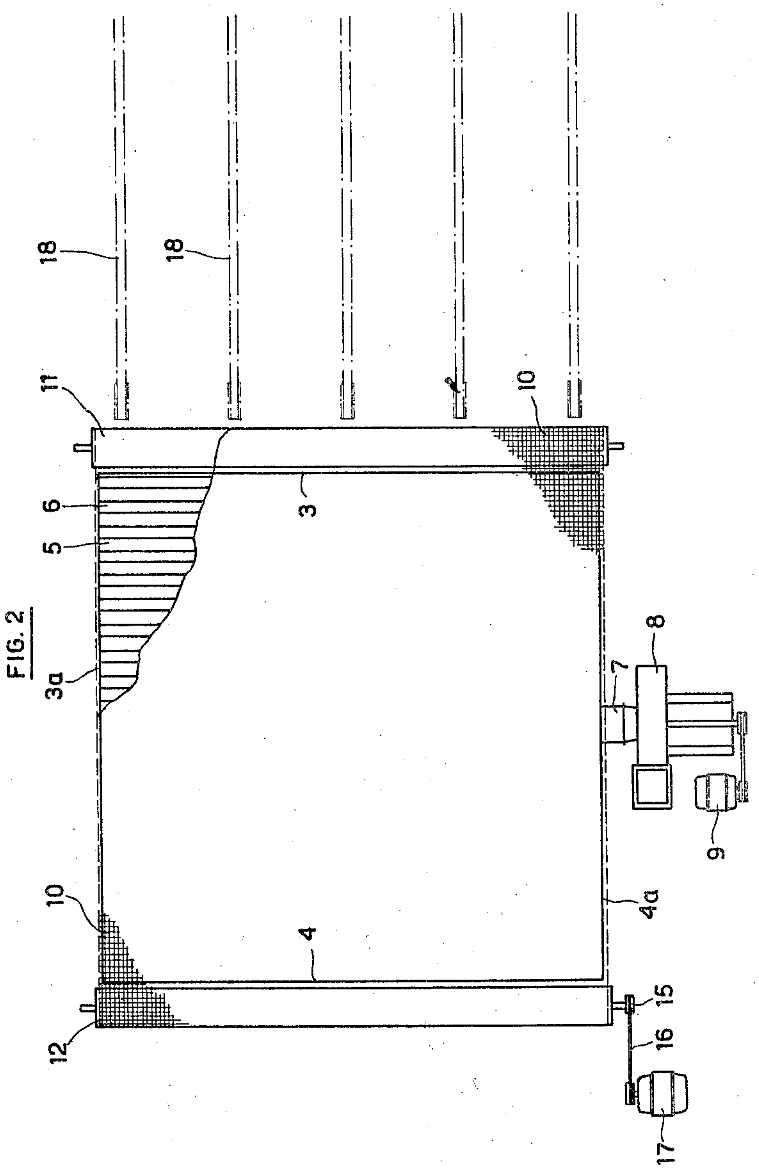
Fig. 2 shows a plane view of the device according to Fig. 1.

The arrangement as illustrated in the drawing comprises a suction box 1 having a plane bottom 2 and plane side walls 3, 3a, 4 and 4a. The suction box is, in addition, provided with a plane upper suction opening 5 being rectangular in section. Right across the opening 5 of the suction box there are provided a number of carrying or supporting members in form of revolving rolls 6 in parallel to each other. These rolls are rotating at their ends in bearings, which are solidly fixed at the suction box 1, although this is not especially illustrated. From the bottom 2 of the suction box 1 extends a suction pipe 7 connected to a suction fan 8, which is driven by an electric motor 9. The motor is kept running continuously to cause the suction box to be under continuous vacuum.

Across the suction opening 5 in the same plane as this one and in the plane of the upper edge of the rolls runs an endless wire screen 10 extending around the four bending rolls 11, 12, 13 and 14. The bending roll 12 is at its one end provided with a driving wheel 15 being driven by a motor 17 by means of a belt 16. The wire screen comprises a close wire screen portion and an open one B provided in series after each other. These portions A and B are substantially of the same length. The close portion is so close that it has substantially the same resistance to the flow of air as the porous fibre board to be cooled. The open portion of the wire may consist of a netting having very spaced wires, a grid of wires, or may comprise wires, chains, lines or the like only extending in the longitudinal direction of the wire (as in Fig. 3) giving the wire screen the character of an endless wire. The close portion of the wire screen is so wide that it will well cover the suction opening 5. Its length is as great as to extend a distance beyond the suction opening to either side when in its suction opening covering position.

18 designates a belt conveyor conveying the hot fibre boards 20 in over the suction opening 5 when coming from a feeding support 19.

The motor 17 constituting the driving means of the wire gauze, is started and stopped by the closing and opening, respectively, of circuits to the motor control (not shown) of the motor 17. For this purpose there are preferably used mercury switches placed in said circuits and operated partly by the close portion of the wire screen and partly by the boards to be cooled. 21, 22 and 23 denote three such mercury switches provided in the path of the wire screen and the boards. Said mercury switches are known per se and are as such not belonging to the present invention. Besides they are in the market and of various makes. 21 denotes a double switch, i. e. it comprises two mercury switches solidly attached to each other and revolving about the same shaft and connected in such a way that in various rotated positions one switch will always be closed while the other one is open. 22 and 23 designate, on the other hand, single mercury switches rotating about one shaft each. The mercury switches are connected in two parallel circuits of the switch case of the motor 17 in such a way that one of the switches of the double one and the switch 22 are connected into the one circuit and the other one of the double switches as well as switch 23 are connected into the other circuit. The effect of said arrangement will be explained further on.

24 denotes a damping device spraying water on the fibre boards by means of a nozzle, before they are fed in over the suction opening 5.

The arrangement acts in the following manner:

In its starting position it is assumed that the motor 9 has been switched on, and the fan 8 keeps the suction box 1 under vacuum. The close portion of the wire screen 10 is assumed to extend from the switch 22 across the suction opening 5 and up to the switch 23 though not touching it. The switch 23 is then open as it is not affected by the wire screen. On the other hand the switch 22 is closed, as it is actuated by the close wire screen. It is assumed that no board 20 is yet fed to the vicinity of the double switch 21, one of these switches thus being closed, i. e. the one belonging to the same circuit as the switch 23. Hence the two circuits to the switch case of the motor 17 are open in one mercury switch and the motor 17 thus standing still.

As soon as a fibre board 20 is fed towards the switch 21, the front edge of the board acts on the double switch 21, and rotates it an angle about its shaft, the closed switch then opening its circuit and the broken one closing its circuit. One of the circuits of the motor 17 will then be closed, and the motor 17 starts and drives the wire screen with a speed being synchronized with the feeding speed of the board 20. The distances are here calculated in such a manner, that the front edge of the board 20 during its movement follows or somewhat covers the back edge of the close portion of the wire screen, the suction box thus beginning to suck air immediately through the board 20 as soon as it passes over the suction opening. The boards 20 generally have considerably greater length than the close portion of the wire screen. During the following movement of the endless wire, the back edge of the close portion of the wire screen will pass the switch 22, which will then loose its contact with the wire and breaks its circuit, thus stopping the motor 17 and hence the movement of the wire. Meanwhile the front edge of the wire screen has reached so far as to get into contact with the switch 23, and by rotating the switch 23 has closed it. The front edge of the close portion of the wire screen will then be just above the switch 23. The fibre board is still being fed by the belt conveyor 18. In this position the switch case of the motor 17 has either of its circuits open at one place. When the back edge of the fibre board 20 passes the double switch 21, the latter loses its contact with board 20 and falls down by its weight and rotates an angle, so that the one switch of the double switch 21 that is closed, will be opened and the open one closed. As the switch now closed in the double switch 21 belongs to the same circuit as the closed switch 23, the motor 17 will be started again, and the front edge of the close portion of the wire screen will follow closely behing or slightly overlapping the back edge of the board 20 and will again run in synchronism with same in over the suction opening, until the front edge of the wire has reached contact with and closed the switch 22 and its back edge has slided past the switch 23 and thus opened same, which will immediately stop the motor 17 and thus the wire screen. The latter and the switches have now taken their initial position again, and the process is repeated, when the next board 20 is fed and acts on the double switch 21. The process will continue fully automatically, as will be understood by the foregoing, and without any risk of any board being broken. The boards are passed through by air during their running over the suction opening and are cooled uniformly.

The cooling of the boards will be increased if they are sprinkled with water before they are fed across the suction opening 5. Such a water sprinkling may occur by means of nozzles 24 connected to a water system. The nozzles may be continuously open and spray finely divided water towards the place where the boards are fed over the suction opening, but they may also be arranged in such a way that the water supply to them is opened by the action of the front edge of the fed board and closed by the action of the back edge of the board. For this purpose it is only necessary that a revolving contact arm of such an arrangement is located in the path of motion of the board, which is an arrangement known per se and does not constitute any part of the present invention.

In the embodiment here described it has been the front edge and back edge, respectively, of the board 20 and the close wire screen portion, which have acted on the mercury switches. This is, of course, not necessary. The mercury switches or other devices corresponding to same may be arranged in other places than those shown and operated by contact marks provided in suitable places of the endless wire or the conveying device for the boards, respectively. In order to facilitate the transport of the boards and the wire screen across the suction opening the supporting rolls 6 may be driven by a separate driving device.

I claim:

1. Apparatus for cooling hot porous fibre boards comprising a suction box having a flat top opening, an endless wire screen including alternate relatively close and open portions arranged in series and each dimensioned to overlie the suction box opening, said close portion of the screen having a resistance to the passage of air substantially the same as the fibre boards to be cooled and the open portion of said screen having substantially no resistance to the passage of air therethrough, means to drive said screen to position said close and open portions thereof successively over the suction box opening, mechanism operable to feed the fibre boards successively onto the screen overlying the suction box opening in timed relation with the positioning of the screen open portion thereover, spray means operable to discharge cooling liquid upon the fibre boards prior to positioning the same over the suction box opening, and a suction device connected to said suction box and operable to draw cooling air and moisture through the fibre boards and screen open portion to thereby cool the boards.

2. Apparatus as claimed in claim 1 wherein the drive means for the screen is controlled by switch means actuated by the fibre boards as they are fed successively into position overlying the suction box opening.

3. Apparatus for cooling hot porous fibre boards comprising a suction box having a flat top opening, an endless wire screen including alternate relatively close and open portions arranged in series and each dimensioned to overlie the suction box opening, said close portion of the screen having a resistance to the passage of air substantially the same as the fibre boards to be cooled and the open portion of said screen having substantially no resistance to the passage of air therethrough, means to drive said screen to position said close and open portions thereof successively over the suction box opening, mechanism operable to feed the fibre boards successively onto the screen overlying the suction box opening in timed relation with the positioning of the screen open portion thereover, and a suction device connected to said suction box and operable to draw air through the fibre boards and screen open portion to thereby cool the boards.

4. Apparatus as claimed in claim 3 wherein the drive means for the screen is controlled by switch means actuated by the fibre boards as they are fed successively into position overlying the suction box opening.

5. Apparatus for cooling hot porous fibre boards comprising a suction box having a flat top opening, an endless wire screen having a portion thereof overlying the top opening of the suction box, means to drive said screen at a predetermined rate over the suction box opening, mechanism operable to feed fibre boards to be cooled successively onto the screen overlying the suction box opening, spray means operable to discharge cooling liquid upon the fibre boards prior to feeding the same over the suction box opening, and a suction device connected to said suction box and operable to draw cooling air and liquid through the fibre boards and screen to thereby cool the boards.

BROR GUNNAR VILHELM INGVE.

REFERENCES CITED

The following references are of record in the file of this patent:

UNITED STATES PATENTS

| Number | Name | Date |
|---|---|---|
| 2,043,415 | Lapeyrouse | June 9, 1936 |
| 2,084,980 | Sweeney | June 22, 1937 |
| 2,111,835 | Berry | Mar. 22, 1938 |
| 2,207,452 | Bingman | July 9, 1940 |
| 2,276,471 | Eberhart | Mar. 17, 1942 |
| 2,366,484 | Bradner | Jan. 2, 1945 |
| 2,418,386 | Wood | Apr. 1, 1947 |
| 2,480,727 | Greyson | Aug. 30, 1949 |